United States Patent [19]

Maloney

[11] Patent Number: 4,928,795

[45] Date of Patent: May 29, 1990

[54] LUBRICATION APPARATUS

[75] Inventor: Joseph J. Maloney, Hartsville, Ind.

[73] Assignee: Reliance Electric Company, Greenville, S.C.

[21] Appl. No.: 156,425

[22] Filed: Feb. 16, 1988

[51] Int. Cl.⁵ .............................................. F16N 27/00
[52] U.S. Cl. ................................... 184/7.4; 184/105.1;
184/105.2; 384/462; 384/474
[58] Field of Search ............... 384/462, 466, 473, 474;
184/7.4, 105.1, 105.2

[56] References Cited

U.S. PATENT DOCUMENTS

| | | | |
|---|---|---|---|
| 1,931,894 | 10/1933 | Gill | 184/7.4 |
| 1,968,017 | 7/1934 | Davis | 184/7.4 |
| 2,135,563 | 11/1938 | Davis | 184/7.4 |
| 2,141,022 | 12/1938 | Rotter | 184/7.4 |
| 2,839,162 | 6/1958 | Formento | 184/105.1 |
| 3,542,442 | 11/1970 | Kent | 384/473 |
| 3,987,869 | 10/1976 | Bowers | 184/105.1 |
| 4,384,863 | 5/1983 | Huff et al. | 474/28 |
| 4,411,590 | 10/1983 | Meredith | 415/26 |
| 4,425,102 | 1/1984 | Huff et al. | 474/28 |
| 4,796,419 | 1/1989 | Braxmeier | 384/474 |

FOREIGN PATENT DOCUMENTS

| | | | |
|---|---|---|---|
| 505549 | 9/1928 | Fed. Rep. of Germany | 384/462 |
| 956379 | 1/1950 | France | 384/474 |
| 189458 | 4/1957 | German Democratic Rep. | 384/462 |

OTHER PUBLICATIONS

Reeves Mechanical Adjustable Speed Drives–p. G–5 (undated).

Primary Examiner—Henry A. Bennet
Assistant Examiner—Denise L. Ferensic
Attorney, Agent, or Firm—Dority & Manning

[57] ABSTRACT

A standard grease fitting for the bore of a main shaft is replaced with an integral lube shaft rotatably supported within the main shaft bore with bearing assemblies. Snap rings hold two sealed bearings, spaced by a spacer element, against a stepped shoulder of the lube shaft, and axially position the lube shaft within the main shaft bore. Seals on the inboard side of the innermost bearing assembly prevent grease from escaping about the outside of the lube shaft. The rotatably mounted lube shaft permits lubrication of the main shaft even as it rotates. Grease may be manually applied, or remotely applied with a grease gun having a controlled, mechanized actuator. Flexible tubing interconnects the grease gun output with the lube shaft so that even readily inaccessible devices may be relatively remotely lubricated, even during their operation. An automatic timer, or other presetable control circuit may be used to automatically actuate the grease gun at timed intervals, or responsive to some other condition such as energization of the device to be lubricated. A sealable housing protects the automatic control circuitry, grease gun, and corresponding actuating mechanisms.

21 Claims, 3 Drawing Sheets

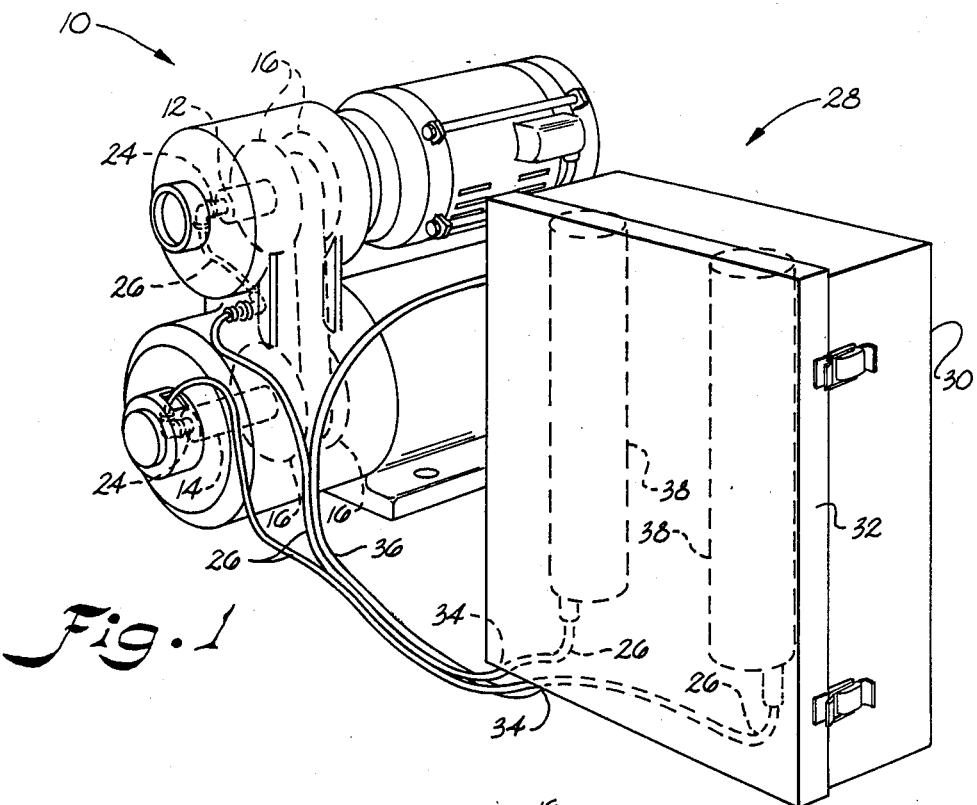
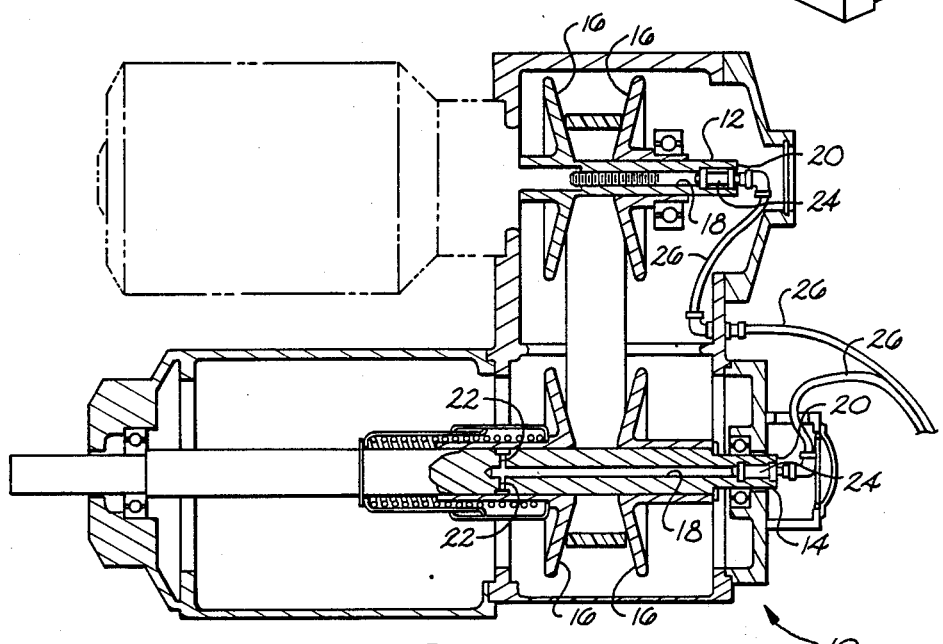

LUBRICATION APPARATUS

BACKGROUND OF THE INVENTION

This invention concerns improved lubrication apparatus in general, and in particular apparatus for lubricating a device even during its operation, or for automatically and/or remotely lubricating a device.

Numerous conventional operative devices include drive members or other members mounted for rotation on a rotatable shaft. Such rotatable shaft may often be provided with a central, co-axial bore therein for receipt of grease. A conventional grease fitting or its equivalent may be secured at an exposed end of such rotatable shaft bore. Periodically, maintenance personnel may lubricate the bore of the rotatable shaft by introducing grease thereto through the grease fitting. However, such operation is labor intensive, and possesses other drawbacks.

For example, a given rotatable shaft to be lubricated may involve a drive application, such as the shafts which support variable discs for constant speed and variable speed assemblies on a mechanical adjustable speed drive. Examples of such drive are provided by U.S. Pats. Nos. 4,425,102 (Huff et al.); 4,411,590 (Meredith); and 4,384,863 (Huff et al.); all of which are commonly assigned with the present invention. For general disclosure purposes with respect to such mechanical adjustable speed drives, the disclosures of such patents are herein incorporated by reference.

Due to the size or configuration of a particular drive application at a given production facility, the grease fittings for such drive devices may be readily inaccessible by maintenance personnel, or even located in a relatively dangerous position. For example, where a particular drive is located at the top of a press assembly or underneath a conveyor, dis-incentives will be presented to any maintenance personnel charged with regularly lubricating such drive.

Moreover, in many commercial drive applications, the drive may need to be operative for hours, days, or even weeks at a time without interruption in support of its associated commercial process. Such drive demand can commonly dictate a need for a regular lubrication schedule. If the commercial activity is inherently dangerous, it may be necessary to halt production merely to permit maintenance personnel to perform routine or regular lubrication maintenance of the drives. Similarly, production must be stopped just for lubrication maintenance if it is impractical to apply grease to the grease fitting during continued operation of the device.

In addition to the foregoing circumstances, some drive applications (including some involving fairly continuous operation) may of necessity be situated in relatively isolated areas where maintenance personnel are not always present. For example, oil rigs (particularly those on off-shore platforms) may require routine visits by maintenance personnel, with one of their primary purposes being lubrication and other maintenance of drives operating otherwise continuously. In such circumstances, even simple lubrication of a conventional drive can be an expensive, and even dangerous, proposition.

SUMMARY OF THE INVENTION

The present invention recognizes and addresses such drawbacks, and other aspects of lubrication engineering. Accordingly, it is one of the general objects of this invention to provide improved lubrication apparatus. It is a more particular object to provide improved lubrication apparatus for lubricating a device, even during operation thereof. More specifically, present apparatus is intended to facilitate lubrication of a rotatable shaft, even during rotation thereof.

It is another more general object of the present invention to provide an improved lubrication apparatus which allows lubrication of a device from a relative distance (i.e., relatively remote from such lubrication apparatus). A more specific object is to provide an integral lube shaft within a main, rotatable shaft, which lube shaft accommodates relatively remote lubrication of the main shaft through tubes or equivalent means connected with the lube shaft.

Another general aspect of the present invention relates to elimination generally of the need for periodic maintenance functions by maintenance personnel. In accordance with such present aspect, one object is to provide automatic lubrication apparatus for achieving lubrication of a given device without requiring specific activity by maintenance personnel. Another present object is to provide such automatic lubrication apparatus in combination with the foregoing aspects of this invention accommodating remote lubrication of a given device (including, alternatively, even during operation thereof).

It is a more particular object of this invention to provide automatic lubrication apparatus which effects periodic lubrication of a given device for selected periods of time at predetermined intervals. It is a further object to provide such an apparatus which may alternatively be further responsive to environmental conditions, conditions of the given device to be lubricated, or other factors, for further automatically controlling lubrication of the given device.

Various embodiments in accordance with the present invention are directed to such present objects and aspects, as well as others. Furthermore, various presently disclosed features and aspects of this invention may be alternatively combined to provide various constructions and embodiments of this invention. One exemplary embodiment of this invention is directed to a lubrication apparatus for supplying lubrication to a main shaft supporting rotatable members thereon, such apparatus comprising a lube shaft having a central bore and respective input and output ends interconnected by the central bore, such lube shaft adapted for being received within the bore of a main shaft; and bearing means for rotatably supporting such lube shaft in such main shaft bore with such lube shaft input end remaining accessible for the application of grease thereto, whereby grease so applied may traverse the central bore for application to the main shaft via the lube shaft output end.

Another of the different exemplary embodiments in accordance with this invention concerns a remote lubrication system for use with grease fittings of devices to be lubricated, comprising reservoir means for holding grease, such reservoir means including at least one grease output from which grease flows whenever the reservoir means is actuated; controllable actuation means, operatively associated with the reservoir means, for selectively actuating the reservoir means; and grease conduit means adapted for conducting grease flowing from the reservoir means grease output to a grease fitting relatively remote therefrom; whereby a device having a grease fitting associated therewith may be selectively lubricated from a reservoir of grease located relatively remote therefrom.

Still further aspects of this invention are embodied in further constructions concerning an automatic lubrication system, comprising grease output means for outputting grease stored therein upon actuation thereof; actuation means for selectively actuating the grease output means responsive to a control signal input thereto; control timer means for outputting control signals to the actuation means at predetermined intervals, so as to actuate the grease output means for a given time at such intervals; and tubing means adapted for interconnecting grease output from the grease output means with a device to be lubricated, and which device is situated relatively remote from the grease output means, or to which device access is generally limited; wherein the length of the predetermined intervals may be selected with the control timer means so as to automatically lubricate a relatively remotely-located or limited-access device at desired intervals.

Another exemplary remote lubrication system constructed in accordance with this invention comprises grease fitting means adapted for association with the bore of a rotatable shaft for the application of grease thereto, such grease fitting means including a grease input which is relatively stationary even during rotation of such rotatable shaft; reservoir means for holding grease, and upon actuation thereof, for outputting such grease from a grease output thereof, such reservoir means being located relatively remote from the grease fitting means; actuation means operatively associated with the reservoir means for selectively actuating same; and tubing means for interconnecting the reservoir means grease output with the grease fitting means grease input; whereby a rotatable shaft may be relatively remotely lubricated, even during rotation thereof.

These and other objects, aspects, and features of this invention are more particularly discussed and described in the remainder of the specification. Various modifications and alterations to features, elements, and constructions disclosed herewith may occur to those of ordinary skill in the art, and are intended to come within the spirit and scope of this invention by virtue of present reference thereto. Such modifications and variations may include, but are not limited to, the substitution of functionally equivalent structures and elements for those expressly disclosed, illustrated, or suggested herewith, as well as the interchange of various features and elements (e.g. reversal of parts) presently disclosed.

BRIEF DESCRIPTION OF THE DRAWINGS

A full and enabling disclosure of the present invention, including the best mode thereof, to one of ordinary skill in the art is set forth more particularly in the remainder of this specification, including reference to the accompanying figures, in which:

FIG. 1 illustrates a perspective view (in partial see-through) of an exemplary lubrication apparatus in accordance with the present invention, relatively remotely located from a device to be lubricated, which device incorporates an exemplary embodiment of an improved grease fitting in accordance with the present invention;

FIG. 2 illustrates a longitudinal cross-sectional view of the exemplary device to be lubricated as illustrated in FIG. 1, showing in greater detail the relationship thereof to an improved grease fitting apparatus in accordance with the present invention;

Figure 3:
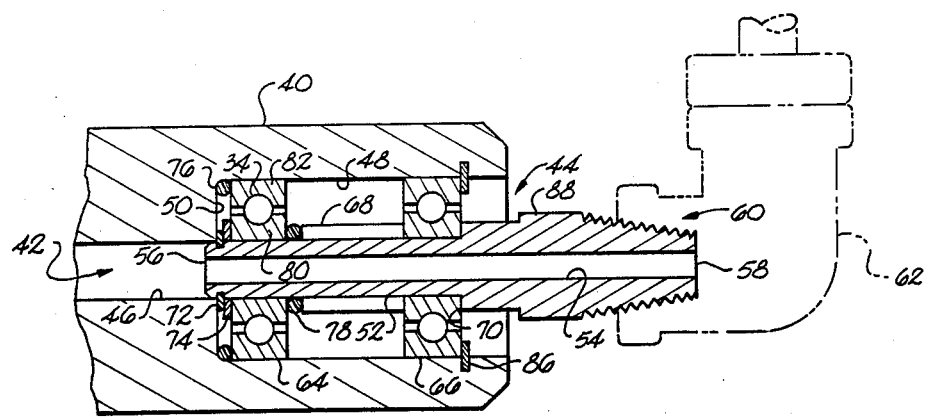
FIG. 3 illustrates an enlarged, cross-sectional view of another embodiment of an improved grease fitting (or lubrication apparatus) in accordance with the present invention, particularly for supplying grease to a given rotatable shaft.

Repeat use of reference characters in the following specification and appended drawings is intended to represent the same or analogous features or elements of the present invention.

DETAILED DESCRIPTION OF THE PREFERRED EMBODIMENTS

Preferred embodiments of this invention represented in present FIGS. 1 and 2 are for purposes of illustration only adapted for use with the REEVES MOTODRIVE Mechanical Adjustable Speed Drive (both REEVES and MOTODRIVE are registered Trademarks of Reliance Electric Corporation). However, it is to be well understood by one of ordinary skill in the art that features and aspects of the present invention may be practiced for the lubrication of numerous and various types of devices to be lubricated. Hence, present illustration of a mechanical adjustable speed drive merely serves as a convenient example of a device to be lubricated, and with which the present invention may be readily and advantageously practiced.

Mechanical adjustable speed drive 10 is one example of a device which preferably should be periodically lubricated, with a preferred lubrication schedule depending to a certain degree on the schedule of use thereof. General operation of drive 10 is disclosed in detail by the patents recited in the Background portion of this specification, which patents are incorporated herein by reference. Selected internal features of drive 10 and the remaining apparatus in FIG. 1 are illustrated in dotted line, while general external features thereof are in solid line.

In general, drive 10 includes a pair of rotatable shafts (or main shafts) 12 and 14 which support operative members thereon. In this instance, such operative members are variable discs 16 which function in drive 10 in a manner known to those of ordinary skill in the art without requiring further explanation. Discs 16 are fixedly received about their respective rotatable shafts 12 and 14, and rotate during operation of drive 10. In view of such rotation and corresponding friction created thereby (such as between the discs and the belt commonly entrained thereabout), periodic lubrication of the drive (particularly the disc surfaces) is desireable.

Conventionally, rotatable shafts 12 and 14 include central bores 18 into which grease may be introduced through standard grease fittings received adjacent respective outboard ends 20 thereof. Grease or other lubricants introduced into bores 18 may penetrate in inboard direction (i.e. away from ends 20) to lubricate the interior of drive 10 generally. Intersecting lubrication bores 22 or other features may cooperate with bores 18 in such lubrication.

In accordance with one aspect of the present invention, existing drives with standard grease fittings may be retrofit with lubrication apparatus in accordance with this disclosure. Such standard grease fittings (typically seated in the outboard ends 20 of rotatable shaft bores 18) are replaced with lubrication grease fittings 24 in accordance with this invention. Detailed exemplary embodiments of such grease fittings of the present invention are discussed further below with reference to present FIGS. 3 and 4. Exemplary grease fittings 24 of this invention may be adapted as represented in present FIGS. 1 and 2 for attachment (either temporary or relatively permanent) to tubing means 26 through which grease may be supplied to grease inputs of such grease fittings 24. Alternatively, grease may be directly supplied thereto from a grease gun or similar manual article.

As discussed further below, grease fitting 24 is particularly adapted for permitting the application of grease thereto (with or without tubing means) even during rotation of respective rotatable shafts 12 or 14. In general, such an advantageous feature is obtained by provision of an integral lube shaft located within bores 18 of main shafts 12 and 14. Preferably, such integral lube shaft is rotatably mounted within bore 18 so that a grease input thereof may remain relatively stationary even during rotation of the corresponding main shaft within which such integral lube shaft is received. Such features are detailed in present FIGS. 3 and 4, discussed below.

As more particularly represented by present FIG. 1, in accordance with further, alternative aspects of the present invention, grease may be relatively remotely supplied through tubing means 26 to grease fittings 24 of this invention from an automatic lubrication apparatus 28 in accordance with this invention. Apparatus 28 with tubing means 26 may also be used to automatically lubricate a standard type grease fitting, especially during periods whenever the corresponding device to be lubricated is not in operation. Such apparatus preferably (though not necessarily) includes a generally sealable housing 30 having a closeable cover 32. When used, such housing advantageously affords protection for the automatic lubrication apparatus enclosed therein, regardless of the surrounding environment of drive 10, or whatever the installation. Tubing means 26 pass through openings 34 defined in the otherwise enclosed housing, except that a similar opening may be provided for the introduction of a power cable or even a remote control cable 36 into housing 30.

Various lubrication apparatus embodiments in accordance with the present invention may be protectively received within housing 30, or otherwise disposed in operative relationship with grease fittings (either of the conventional type or in accordance with the present invention), or with tubing means. However, as generally represented by present FIG. 1, reservoir means 38 are provided for supplying grease to drive 10 via interconnection with tubing means 26. Examples of such reservoir means, and actuation means for controlling the output of grease therefrom, are discussed in detail below in conjunction with present FIGS. 5 and 6. A respective pair of such reservoir means and associated tubing means are illustrated in FIG. 1 merely for correspondence with the pair of grease fittings required for drive 10. Obviously, fewer or greater numbers of such elements and features of this invention may vary with given embodiments thereof.

Though for convenience of illustration present FIG. 1 represents automatic lubrication apparatus 28 as apparently relatively adjacent drive 10, such juxposition is considered relatively remote in the context of the present invention. In other words, the lubrication apparatus of this invention for supplying grease or equivalent lubricants to grease fitting 24 (or other grease fittings) are interconnected to such grease fittings through tubing means or their equivalents, i.e., through some means other than the direct "docking" of a manual device such as a grease gun tip to the grease fitting. Thus, those of ordinary skill in the art will appreciate that the term "relatively remote" in the context of the present invention would encompass apparently otherwise "close" positions as represented by present FIG. 1, or separations of up to 50 feet or more between drive 10 and apparatus 28. In general, the only limitation on the length of tubing means 26 is the practical pumping distance for a particular embodiment of apparatus 28. Tubing means 26 preferably comprises some plastic, rubber, or other form of flexible tubing though less flexible tubing such as copper or the like may be used. Even greatly shortened runs of means for interconnecting device 10 and apparatus 28 may constitute relatively remote placements in the above-explained context of the present invention.

More specific details of lubrication apparatus pertaining to a grease fitting in accordance with the present invention are discussed hereinafter with reference to FIGS. 3 and 4 (with FIG. 3 being a longitudinal cross-section of such features, and FIG. 4 being an exploded, perspective thereof). A main or rotatable shaft 40 includes a bore 42 into which grease may be introduced, as discussed above with reference to FIGS. 1 and 2. A grease fitting in accordance with this invention may be provided as original equipment with a given device, or as a retrofit thereto. For example, in a retrofit embodiment, bore 42 may be initially fitted with a conventional grease fitting at the outboard end 44 thereof. Typically, bore 42 will have a relatively smaller diameter (such as illustrated in section 46 thereof) extending to outboard end 44. The conventional grease fitting is preferably removed, and an outboard section in bore 42 thereafter enlarged to a diameter as illustrated in portion 48, which results in an inner shoulder 50 of bore 42.

Of course, a bore 42 with differing diameter portions 46 and 48 thereof may be originally provided in a device to be lubricated. In either retrofit or original equipment embodiments, bore 42 of main shaft 40 is fitted with an integral lube shaft 52, preferably having a central bore 54 extending coaxially along the length thereof and interconnecting between an inboard end 56 and an outboard end 58. Mounting threads 60 or equivalent features may be provided about end 58 for mating with tubing means 62 (discussed above in greater detail with reference to FIGS. 1 and 2). Alternatively, outboard end 58 may directly receive input from a conventional grease gun or the like.

In general, as illustrated by FIG. 3, outboard end 58 remains generally accessible while a portion of lube shaft 52 is received within rotatable shaft bore 42. Grease introduced through tubing means 62 (or with alternative means) enters outboard end 58 of lube shaft 52, traverses central bore 54 thereof, and exits inboard end 56 for lubricating main shaft 40.

To facilitate lubrication of main shaft 40 even during rotation thereof, lube shaft 52 is rotatably supported in bore 42 by bearing means. In the preferred embodiment of present FIGS. 3 and 4, such bearing means includes a pair of bearing assemblies 64 and 66, preferably spaced at respective axial positions along lube shaft 52 so as to support such shaft at respective relative inboard and outboard portions of bore 42. Such separated support provides smooth rotatable action of shaft 40 relative shaft 52.

Spacing of bearing assemblies 64 and 66 may be variously accomplished in accordance with the present invention. In the illustrated exemplary embodiment, a generally cylindrical spacer member 68 is positioned about lube shaft 52 for such purpose. The position of the respective bearing assemblies relative lube shaft 52 is further determined by providing stepped sections along lube shaft 52. In particular, a shoulder 70 is defined on such shaft for receiving the outermost bearing assembly 66, while a retaining ring such as a snap ring 72 may be provided on a relatively inboard end 56 of shaft 52 for holding the bearing assemblies and spacer member 68 against shoulder 70. Snap ring 72 generally cooperates with an annular recess 73 defined in shaft 52.

A flat washer 74 or the like is received generally about the inside diameter of innermost bearing assembly 64 to cooperate therewith for establishing a labyrinth-type seal, which prevents the passage of grease towards the outboard side of the bearing means outside lube shaft 52. Another purpose of washer 74 is to prevent grease under pressure from purging itself back through the bearing means, which could damage the bearing means. An O-ring 76 may be provided adjacent the outside diameter of such bearing means also on its inboard side for further contributing to the sealing means function of washer 74. O-ring 76 is preferably slightly compressed against inner shoulder 50 of bore 42 whenever the lubrication apparatus in accordance with the present invention is fitted into such bore. A further O-ring 78 may optionally be provided on an outboard side of the inside diameter portion of bearing assembly 64 to back up flat washer 74. Whenever O-ring 78 is omitted, spacer member 68 is preferably extended to complete axial support between bearing assemblies 64 and 66.

Various alternatives may be practiced for rotatably supporting lube shaft 52 within bore 42, but sealed bearings are preferred. As generally known in the art, such bearing assemblies include an inner race 80 and an outer race 82 rotatably supported relative thereto with a plurality of entrained roller bearings 84. In this embodiment, preferably outer race 82 forms a slight interference fit with enlarged diameter portion 48 of bore 42, while the inside diameter of inner race 80 forms a slight interference fit with the outside diameter of lube shaft 52. In such construction, outer race 82 is free to rotate with rotatable shaft 40, while inner race 80 remains relatively stationary together with lube shaft 52. Thus, a permanently attached fixture such as tubing means 62 is accommodated for lubricating main shaft 40 even during rotation thereof.

A second snap ring 86 may be provided to further define retaining means for axially positioning lube shaft 52 relative shaft 40. Snap ring 86 may cooperate with the inside diameter of bore 42 and the outside diameter of bearing means, while retaining ring 72 cooperates as illustrated with other features to fix the position of such bearing means on lube shaft 52. Inboard end 56 of lube shaft 52 also cooperates with inner shoulder 50 of bore 42 for defining the axial position of the respective shafts, which is then secured by snap ring 86.

To further facilitate introduction and removal of lube shaft 52 from bore 42, a flatted axial portion 88 may be provided on shaft 52 adjacent the accessible free end 58 thereof. Further use of such flatted area, which is particularly adapted for engagement with a wrench or like device, may be made during fitting of tubing means 62 to threads 60 or the like.

Figure 4:
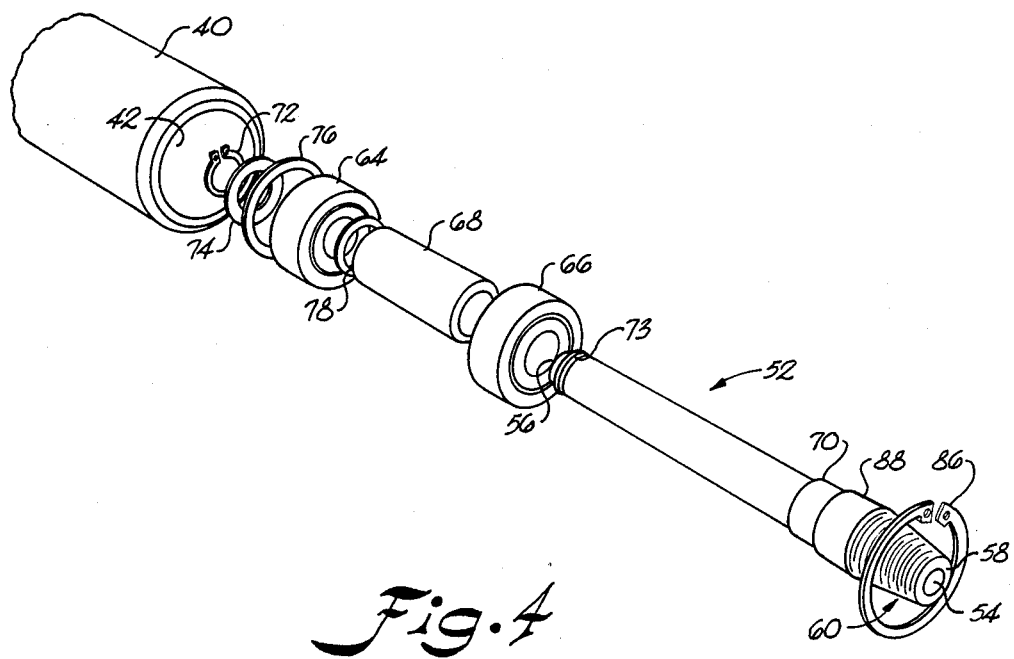
FIG. 4 illustrates an exploded, perspective view of the exemplary embodiment of the present invention as illustrated in present FIG. 3.

The foregoing exemplary structure of FIGS. 3 and 4 illustrates lubrication apparatus in accordance with the present invention which provides for either remote or direct lubrication of main shaft 40, even during rotation of such shaft. The relative rotation of lube shaft 52 and main shaft 40 is accomplished with bearing means. Both the bearing means and lube shaft are axially secured within bore 42 with retaining means, and the entire apparatus is sealed against grease leakage about the lube shaft by sealing means as discussed above.

While a preferred embodiment is illustrated by such FIGS. 3 and 4, modifications and variations thereto for accommodating specific installations may be practiced by those of ordinary skill in the art while still practicing the functions and obtaining the advantages outlined above. For example, the length of bore 42 from its outboard end 44 to its inner shoulder may be a little over one inch, with other features sized accordingly. Alternatively, such dimensions may vary widely to accommodate particular applications. Even the stepped features of bore 42 and shaft 52 may be altered by those of ordinary skill in the art to meet particular requirements, while practicing the present invention.

Figure 5:
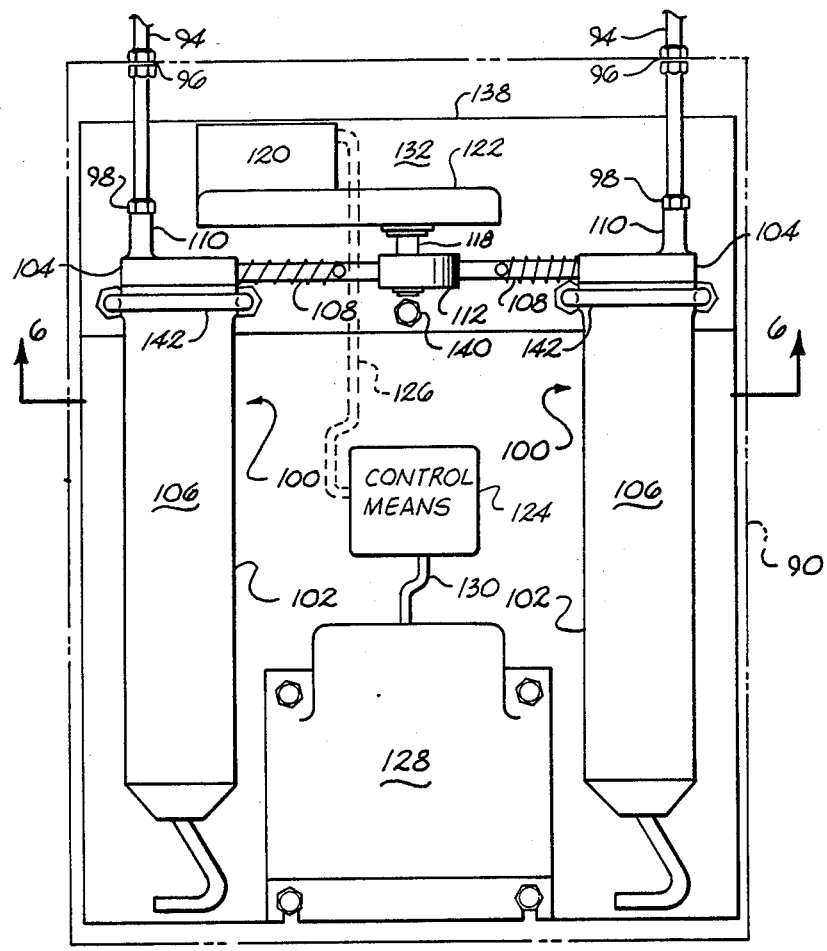
FIG. 5 illustrates a plan view of an automatic lubrication apparatus embodiment in accordance with further aspects of the present invention.
Figure 6:
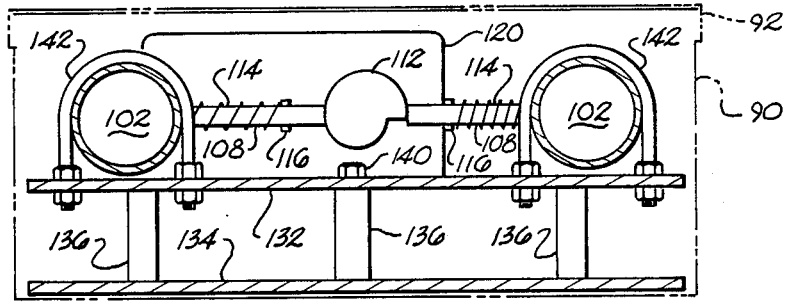
FIG. 6 illustrates a cross-sectional view of the exemplary apparatus as in present FIG. 5, as indicated by section line 6—6 therein.

Present FIGS. 5 and 6 more particularly concern features of the present invention directed to automatic lubrication apparatus, such as for automatically supplying grease through tubing means 62 or their equivalents to central bore 54 of lube shaft 52 (discussed above), or even to conventional grease fittings. To protect automatic lubrication apparatus in accordance with the present invention from any potentially adverse environmental conditions, such apparatus is preferably for the most part enclosed within a sealable housing 90 having a closeable top such as a hinged door 92 (all of which housing features are illustrated in dotted line in FIGS. 5 and 6). FIG. 5 illustrates in general diagrammatic form a plan view of apparatus contained within housing 90, with lid 92 thereof opened. FIG. 6 represents a sectional view of such apparatus taken along the line 6—6 as indicated in FIG. 5.

Tubing means 94 pass through housing 90 at defined openings 96 thereof. With threadable fittings 98 or the like, such tubing means directly connects at one end thereof to reservoir means 100, which upon actuation thereof pump grease through tubing means 94 to a device to be lubricated. Such reservoir means may comprise a variety of structures, such as conventional grease guns 102. An example of such grease guns suitable for incorporation into the present invention are the Stewart Warner Alemite A-400 grease guns, which have separable head portions 104 and body portions 106 to facilitate reloading of the body portions. Furthermore, such head portions incorporate piston-type actuators 108 for pumping grease from an output 110 thereof. Mechanized, controlled actuation of such piston members in accordance with the present invention is further discussed hereinbelow.

In general, where a pair of grease guns 102 are used (as illustrated in the presently preferred exemplary embodiment which is adapted for use with the twin lubrication points of device 10) a single rotatable cam 112 may be used for efficiently actuating both pistons 108. In particular, springs 114 surrounding pistons 108 and interconnected thereto with pins 116 form cam followers which follow the surface of cam 112. As understood by those of ordinary skill in the art, rotation of cam 112 about axis 118 thereof causes pumping action for grease guns 102 by actuation of their respective piston-type actuators. Variations in the surface of cam 112 may be used to establish desired pumping performance for grease guns 102.

Operation of rotatable cam 112 is under the control of its driving device, preferably in this embodiment a servo motor 120 and interconnecting gear drive 122. Virtually any controllable drive mechanism, or other actuating device, may be used in accordance with the present invention to control the outputting of grease from reservoir means 100. In the presently preferred embodiment, electronic control means 124 provides control output signals along line 126 to control operation of servo motor 120. In general, control circuits for establishing such output signals adequate to drive a servo motor are generally known to those of ordinary skill in the art. Accordingly, details thereof need not be repeated herewith for an understanding of the present invention.

Further in accordance with the present invention, such control means 124 preferably incorporates timer control means, which may be settable to cause operation of servo motor 120 for given periods of time at selected intervals. For example, servo motor 120 may be operated for a period of time such as 30 seconds at a selected interval such as 12 or 24 hours. The range of operation times and intervals therebetween which may be selected is virtually limitless, and to a considerable degree depends on the particular application of the present invention with a particular device to be lubricated and the needs of such device. Thus, those of ordinary skill in the art may by practicing the present invention establish such automatic lubrication times and intervals therebetween which are in their judgment appropriate for the devices to be lubricated.

Further in accordance with the present invention, control means 124 may alternately receive feedback relative operation of the device to be lubricated, or the environment thereof, for establishing further automatic lubrication. For example, housing 90 may incorporate a transformer 128 which receives electrical power as the device to be lubricated receives electrical power for energization thereof. Through electrical connection 130, control means 124 may be operated to automatically reset the timing of a predetermined interval of time with each such energization of the device to be lubricated. Alternatively, control means 124 may operate to cause operation of servo motor 124 for a given a period of time upon each such energization, all so that a desired regimen of lubrication for such device is established. Or, if tubing means 94 are not connected with a grease fitting which permits lubrication of its associated device during its operation, information relative energization of such device can be used to ensure automatic lubrication only during periods of nonenergization. Variations of such control to accommodate different desired lubrication regimens are intended to come within the spirit and the scope of the present invention.

As represented by incoming line 36 of FIG. 1, control means 124 may also be made responsive to remote control prompting for lubrication, either slaved to a master controller, or selectively input thereto by an operator. For example, if the device to be lubricated is on an off-shore drilling platform, an on-shore operator could override any pre-set regimen of operation for control means 124 and initiate a lubrication operation, all in accordance with the present invention.

As yet a further aspect of the present invention, a portion of automatic lubrication apparatus supported within housing 90 is preferably mounted on a movable planar member 132 which may be supported from a base member 134 by spacer members 136. In particular, a side edge 138 of planar member 132 may be pivotably supported relative the remainder of housing 90, so that upon removal of a locking means 140 (preferably comprising a single bolt threadably received in central spacer member 136), servo motor 120, gear drive 122, rotatable cam 112, and head portions 104 of grease guns 102 may be pivoted in common to facilitate removal and reloading of body portions 106 of such grease guns. U-bolts 142 or equivalent structures secure body portions 104 of the grease guns to such pivoting planar member 132. By the foregoing construction, simple removal of the single bolt 140 (or its equivalent) permits plate 132 to be tilted out from housing 90 for removal of the grease gun body portions. Thus, an automatic lubrication apparatus is provided which is particularly adapted for facilitating both protection of such apparatus during use, and for relatively simple reloading of reservoir means 100 thereof.

As further understood by those of ordinary skill in the art from the foregoing specification, various embodiments of the present invention may be directed solely to the lube shaft and corresponding structure illustrated in present FIGS. 3 and 4, solely to the automatic lubrication apparatus illustrated in present FIGS. 5 and 6, and combinations of such features as represented in the illustration of present FIG. 1. Moreover, it will be understood by those of ordinary skill in the art that the foregoing specification and drawings discussed with reference thereto are only exemplary embodiments of the present invention, with all such language being by way of example only. Use with particular drives, or to establish particular automatic lubrication regimens may be established for particular applications practiced by those of ordinary skill in the art, all within the spirit and scope of the present invention. Moreover, individual features and aspects of the foregoing exemplary embodiments may be varied for accommodating such alternative applications, all without departing from the spirit of the present invention set forth in the appended claims.

What is claimed is:

1. A lubrication apparatus for supplying lubrication to a main shaft supporting rotatable members thereon for lubricating such rotatable members, said apparatus comprising:

a lube shaft for the passage of lubricant therethrough, having a central bore and respective input and output ends interconnected by said central bore, said lube shaft adapted for being received within the bore of a main shaft supporting rotatable members thereon to be lubricated; and bearing means for rotatably supporting said lube shaft in a bore of a main shaft with said lube shaft input end remaining accessible for the application of grease thereto, whereby grease so applied may traverse said central bore for application to the main shaft upon exiting said lube shaft output end.

2. A lubrication apparatus as in claim 1, wherein:
the main shaft comprises a rotatable shaft;
said bearing means comprises a pair of bearing assemblies having respective interference fits with the main shaft bore inside diameter and the outside diameter of said lube shaft; and
said lubrication apparatus further includes a spacer element for spacing said pair of bearing assemblies relative said lube shaft.

3. A lubrication apparatus as in claim 2, further comprising:
retaining means for retaining said lube shaft and said bearing means generally axially secured within the bore of a main shaft; and
sealing means for sealing the inboard side of the innermost bearing assembly against the passage of grease to the outboard side thereof around the outside of said lube shaft.

4. A lubrication apparatus as in claim 3, wherein:
the bore of the main shaft comprises a stepped bore, with the inboard end of said lube shaft cooperating with an inner shoulder thereof for positioning of said lube shaft; and
said retaining means includes a snap ring element situated relatively near an outboard opening of the main shaft bore for securing said lube shaft inboard end against the main shaft bore inner shoulder.

5. A lubrication apparatus as in claim 3, wherein said sealing means includes:
a flat washer for sealing generally adjacent the inside diameter of said inboard side of said innermost bearing assembly; and
an O-ring for sealing generally adjacent the outside diameter of said inboard side of said innermost bearing assembly, said O-ring being slightly compressed during fitting of said lubrication apparatus within a main shaft bore.

6. A lubrication apparatus as in claim 2, wherein:
said lube shaft comprises a stepped shaft, including at least one shoulder cooperating with the outermost bearing assembly for positioning same on said lube shaft, and cooperating with a snap ring for holding said bearing assemblies with said spacer member therebetween; said stepped shaft further including an engageable portion, adjacent said at least one shoulder, and adapted for being engaged with a wrench; and
said stepped shaft further defines pipe fitting threads about the free outboard end thereof, adapted for securement of a pipe thereto, by which pipe grease may be applied to said lubrication apparatus for lubrication of its corresponding main shaft.

7. A remote lubrication system for supplying lubrication to rotating hollow shafts supporting operative members such as variable discs on a mechanical adjustable speed drive requiring lubrication, for the passage of lubricant through such rotating hollow shafts to lubricate such operative members supported thereon, said system comprising:
an integral lube shaft for the passage of lubricant therethrough and adapted to be co-axially supported within the bore of a rotatable hollow shaft for one of a constant speed assembly and a variable speed assembly of a mechanical adjustable speed drive, said integral lube shaft having an input end with a grease fitting adapted for receipt of a grease supply, an output end received within the rotatable hollow shaft bore for supplying grease to same for lubricating operative members supported on such rotatable hollow shaft, and a central bore interconnecting such input and output ends for the passage of grease therebetween;
bearing means for rotatably supporting said integral lube shaft within such rotatable hollow shaft bore;
retaining means, cooperating with said integral lube shaft and the rotatable hollow shaft bore inside diameter, for axially securing said integral lube shaft relative such rotatable hollow shaft bore; and
sealing means, associated with an inboard side of said bearing means, for preventing grease within the rotatable hollow shaft bore from passing to the outboard side of said bearing means by penetration thereof outside of said integral lube shaft;
whereby a given rotatable hollow shaft may be lubricated, even when rotating, by the application of grease to said grease fitting of such a remote lubrication system received within the bore of such rotatable hollow shaft.

8. A remote lubrication system as in claim 7, wherein:
said retaining means also cooperates with said bearing means for axially securing same relative the rotatable shaft bore;
said bearing means comprises a pair of bearing assemblies axially spaced on said lube shaft; and
said bearing assemblies have outside diameters and inside diameters which form slight interference fits with the inside diameter of the rotatable shaft bore and the outside diameter of said integral lube shaft, respectively.

9. A remote lubrication system as in claim 8, wherein said retaining means includes a pair of snap rings generally situated on opposite ends of the rotatable shaft bore, with at least one of such rings cooperating with such rotatable shaft bore for axial securement of said lube shaft and bearing means relative same.

10. A remote lubrication system as in claim 7, wherein:
said grease fitting includes mounting threads defined thereon;
said lube shaft includes a flatted area adjacent said grease fitting for application of a wrench thereto; and
said lube shaft further includes a step shoulder adjacent said flatted area thereof for axial positioning of said bearing means relative said lube shaft.

11. A remote lubrication system as in claim 7, wherein said sealing means includes two respective annular members for sealing at the inside diameter and outside diameter, respectively, of the inboard side of said bearing means.

12. A remote lubrication system as in claim 11, wherein:
said inside diameter annular member includes a flat washer forming a labyrinth seal with said bearing means, with said sealing means further including a back-up O-ring opposite said flat washer on the outboard side of said bearing means inside diameter; and
said outside diameter annular member includes an O-ring slightly compressed into such position cooperative with a step shoulder defined in the bore of the rotatable shaft.

13. A remote lubrication system for rotating shafts supporting operative members such as variable discs on a mechanical adjustable speed drive requiring lubrication, comprising:
- an integral lube shaft adapted to be co-axially supported within the bore of a rotatable shaft for one of a constant speed assembly and a variable speed assembly of a mechanical adjustable speed drive, said integral lube shaft having an input end with a grease fitting adapted for receipt of a grease supply, an output end received within the rotatable shaft bore for supplying grease to same, and a central bore interconnecting such input and output ends for the passage of grease therebetween;
- bearing means for rotatably supporting said integral lube shaft within such rotatable shaft bore;
- retaining means, cooperating with said integral lube shaft and the rotatable shaft bore inside diameter, for axially securing said integral lube shaft relative such rotatable shaft bore; and
- sealing means, associated with an inboard side of said bearing means, for preventing grease within the rotatable shaft bore from passing to the outboard side of said bearing means by penetration thereof outside of said integral lube shaft;
- whereby a given rotatable shaft may be lubricated, even when rotating, by the application of grease to said grease fitting of such rotatable shaft
- wherein said bearing means comprise sealed bearings including an inner race and an outer race, with supporting roller bearings therebetween; and wherein
- said outer race turns with rotation of the rotatable shaft while said lube shaft and said inner race remain stationary to permit application of grease to said lube shaft grease fitting even during such rotation of the rotatable shaft and operative members supported thereon.

14. A remote lubrication system, comprising:
- grease fitting means adapted for association with the bore of a rotatable shaft for the application of grease thereto, said grease fitting means including a grease input which is relatively stationary even during rotation of such rotatable shaft;
- reservoir means for holding grease, and upon actuation thereof, for outputting such grease from a grease output thereof, said reservoir means being located relatively remote from said grease fitting means;
- actuation means operatively associated with said reservoir means for selectively actuating same; and
- tubing means for interconnecting said reservoir means grease output with said grease fitting means grease input;
- wherein said grease fitting means includes an integral lube shaft rotatably supported with bearing means within the bore of a rotatable shaft, said lube shaft including a central bore therein for application of grease thereto;
- whereby a rotatable shaft may be relatively remotely lubricated, even during rotation thereof.

15. A remote lubrication system as in claim 14, wherein:
- said reservoir means includes an actuatable grease gun; and
- said actuation means includes a servo motor drive mechanism and settable timer for controlling operation of said servo motor, said servo motor being operatively associated with said grease gun for actuation thereof at desired intervals of time.

16. A remote lubrication system as in claim 15, wherein:
- said grease fitting means further includes at least one retaining ring for retaining said lube shaft and bearing means within the bore of a rotatable shaft, and further includes sealing means disposed on the inboard side of said bearing means for retaining grease within such rotatable shaft radially outward from the outside diameter of said lube shaft;
- said actuatable grease gun includes a piston-type member for actuation thereof; and
- said actuation means includes a rotatable cam driven by operation of said servo motor, and positioned relative said grease gun piston-type actuator for pumping said grease gun by rotation of said cam.

17. A remote lubrication system as in claim 14, further comprising:
- a relatively sealed housing for receipt of said reservoir means and actuation means for protection of same from environmental conditions, said housing defining at least one opening for passage of said tubing means therethrough; and
- wherein said tubing means includes flexible tubing of a predetermined length for interconnecting said housing with the bore of a rotatable shaft to be lubricated, whereby apparatus for lubricating such rotatable shaft may be relatively remotely located therefrom in a relatively protected environment.

18. A lubrication system for automatically lubricating a generally limited-access or relatively remotely-located rotatable shaft, even during rotation thereof, said system comprising:
- a lube shaft received in the bore of a rotatable shaft to be lubricated, said lube shaft including therein a central bore along the axial length thereof and interconnecting between openings at each axial end of said lube shaft;
- bearing means received in such rotatable shaft bore for rotatably supporting said lube shaft therein;
- retaining means for axially securing said lube shaft and said bearing means within such rotatable shaft bore, with one axial end opening of said lube shaft remaining accessible outside such rotatable shaft bore;
- sealing means for preventing grease on the inboard side of said bearing means, relative the rotatable shaft bore, from escaping to the outboard side thereof about said lube shaft;
- at least one grease gun and corresponding piston-action pump actuator therefor located relatively remotely from said lube shaft;
- tubing means interconnecting said grease gun with said one accessible axial end opening of said lube shaft for conducting grease therebetween;
- controllable powered cam means, operatively associated with said grease gun piston-action pump actuator, for selectively pumping grease from said grease gun along said tubing means to said lube shaft; and
- timer control means for controlling said cam means so as to automatically pump grease from said grease gun to a rotatable shaft bore through said tubing means and said lube shaft central bore, for given periods of time at selected intervals of time, even though such rotatable shaft may be rotating, or may be located relatively remotely from said grease gun or with limited access thereto.

19. A lubrication system as in claim 18, wherein:
said bearing means includes a pair of bearing assemblies generally fixedly spaced along the axis of said lube shaft;
said retaining means includes a pair of snap rings disposed about said lube shaft for engaging such shaft and said bearing means for axially securing same; and
said sealing means includes a flat washer and an O-ring disposed about the inside diameter and outside diameter, respectively, of the inboard side of the innermost of said two bearing assemblies.

20. A lubrication system as in claim 19, wherein:
said system includes a pair of said grease guns and corresponding actuators therefor situated in parallel, with said actuators thereof in operative engagement with said cam means for common actuation thereof during operation of said cam means.

21. A lubrication system as in claim 20, further comprising a generally sealable housing for receipt of said grease guns, said cam means, and said timer control means, said housing defining at least one opening for passage of said tubing means therethrough, and including a pivoting panel therein with said cam means and said grease guns mounted thereon, whereby pivoting of such panel facilitates re-loading of said grease guns.

* * * * *